(12) United States Patent
Muller

(10) Patent No.: US 6,217,006 B1
(45) Date of Patent: Apr. 17, 2001

(54) CLOSED ENDED TUBULAR SAFETY DEVICE AND METHOD

(76) Inventor: James J. Muller, 1430 Driftwood Ave., Palatine, IL (US) 60067

( * ) Notice: Subject to any disclaimer, the term of this patent is extended or adjusted under 35 U.S.C. 154(b) by 0 days.

(21) Appl. No.: 09/116,103

(22) Filed: Jul. 15, 1998

(51) Int. Cl.[7] .............................. B63B 35/03; H02G 1/08
(52) U.S. Cl. ........................ 254/134.3 FT; 361/600; 138/96 T; 174/65 R
(58) Field of Search ......................... 361/600, 837; 254/134.3 FT, 134.3 R, 415; 138/89, 96 T, 96 R, 104; 174/50.52, 83, 65 R; 285/149.1, 154.1

(56) References Cited

U.S. PATENT DOCUMENTS

| | | | |
|---|---|---|---|
| 1,347,765 | * | 7/1920 | Shrum ................................ 138/96 R |
| 3,104,681 | * | 9/1963 | Gray, Jr. ............................. 138/96 R |
| 3,574,312 | * | 4/1971 | Miller ..................................... 138/96 |
| 3,787,606 | * | 1/1974 | Schaeffer ........................... 174/65 R |
| 4,132,665 | | 1/1979 | Nelson . |
| 4,190,196 | * | 2/1980 | Larsen ................................... 233/26 |
| 4,733,888 | * | 3/1988 | Toelke ..................................... 285/4 |
| 4,796,865 | | 1/1989 | Marchetti . |
| 4,951,923 | | 8/1990 | Couture . |
| 5,224,515 | * | 7/1993 | Foster et al. ........................... 138/89 |
| 5,236,177 | | 8/1993 | Tamm . |
| 5,439,031 | * | 8/1995 | Steele et al. ........................... 138/89 |
| 5,452,749 | * | 9/1995 | Johnson et al. ..................... 138/96 T |
| 5,675,194 | * | 10/1997 | Domgan ............................... 307/147 |

FOREIGN PATENT DOCUMENTS 22 34 771 * 2/1973 (DE) ..................................... 138/96

* cited by examiner

Primary Examiner—David A. Scherbel
Assistant Examiner—Hadi Shakeri
(74) Attorney, Agent, or Firm—Charles F. Meroni, Jr.; Meroni & Meroni, P.C.

(57) ABSTRACT

A method and apparatus to allow one person to feed a fishtape through a conduit into an electrical circuit panel box and electrically insulating the fishtape from contact with live electrical wires at the electrical circuit panel box, including the steps of: a) placing a translucent closed ended tubular device onto a first end of an empty conduit extending within the electrical circuit panel box; b) feeding a fishtape through a second end of the conduit until the fishtape hits the translucent closed ended tubular device positioned at the first end of the conduit; c) visually inspecting the translucent closed ended tubular device within the electrical circuit panel box to locate the fishtape; and d) removing the translucent closed ended tubular device that contains the fishtape, whereby one person can feed a fishtape through the conduit until the fishtape hits the translucent closed ended tubular device without hitting any live wires located in the electrical circuit panel box, thereafter the person can then identify which conduit within the electrical circuit panel box contains the fishtape by visually inspecting the closed ended tubular threaded safety device.

8 Claims, 3 Drawing Sheets

CLOSED ENDED TUBULAR SAFETY DEVICE AND METHOD

BACKGROUND OF THE INVENTION

The present invention relates to a new and improved safety device and method used while feeding fishtape to an electrical circuit panel box. More specifically, the device and method of the present invention allow a single user to know when the fishtape has reached the electrical circuit panel box and electrically insulates the fishtape from hitting any live wires located at the electrical circuit panel box.

In the past, while installing wires through conduit extending to an electrical circuit panel box, it has been the practice for a person to feed a fishtape through the conduit until the fishtape comes out the opposite end located at the electrical circuit panel box. This is not always easily accomplished since one person cannot tell if the fishtape has reached the electrical circuit panel box. This could lead to numerous trips to the electrical circuit panel box to see if the fish tape has reached its destination.

Another problem can also arise while feeding fishtape through conduit to an electrical circuit panel box, this being that when the fishtape enters the electrical circuit panel box, the fishtape can come into contact with exposed, live electrical wires, and in turn the fishtape (made of metal) can electrically shock the person feeding the fishtape.

Various different types of wire feeding devices have been proposed to redirect and guide wire and fishtape being fed through conduit, however, none of these devices allow for complete insulation from live electrical wires, nor do they provide an indicator that enables a user feeding a fishtape to know when the fishtape has reached its destination.

These and other types of devices disclosed in the prior art do not offer the flexibility and inventive features of my closed ended tubular threaded safety device and method. As will be described in greater detail hereinafter, the closed ended tubular threaded safety device and method of the present invention differs from those previously proposed.

SUMMARY OF THE INVENTION

According to my present invention I have provided a method for one person to feed a fishtape through a conduit into an electrical circuit panel box remotely located from a point of infeed of the fishtape into the conduit and electrically insulating the fishtape from contact with live electrical wires at the electrical circuit panel box, including the steps of: a) placing a translucent closed ended tubular device onto a first end of an empty conduit extending within the electrical circuit panel box; b) going to a location remote from the electrical circuit panel box and then feeding a fishtape through a second end of the conduit until the fishtape hits the translucent closed ended tubular device positioned at the first end of the conduit; c) visually inspecting the translucent closed ended tubular device within the electrical circuit panel box to locate the fishtape; and d) removing the translucent closed ended tubular device that contains the fishtape, whereby one person can feed a fishtape through the conduit until the fishtape hits the translucent closed ended tubular device without hitting any live wires located in the electrical circuit panel box, thereafter the person can then identify which conduit within the electrical circuit panel box contains the fishtape by visually inspecting the closed ended tubular threaded safety device.

According to other features in invention I have provided a method as described above, wherein a translucent closed ended tubular device is placed on a series of empty conduits extending from the location remote from the electrical circuit panel box to the electrical circuit panel box so that all conduits are electrically isolated at the area of the electrical circuit panel box.

In another feature of my invention I have provided a closed ended tubular threaded safety device for temporary placement on a conduit with a male threaded end extending within an electrical circuit panel box when feeding a fishtape, comprising: a tube having a closed end, the tube having an open end opposite the closed end, the tube having internal female threads adjacent the open end sized for mated threaded engagement with the male threaded end of the conduit, the tube further being made of a translucent material, whereby when the tube is threadingly engaged upon a male threaded end of a conduit extending within an electrical circuit panel box, one person can feed a fishtape through the conduit until the fishtape hits the closed end of the tube without the fishtape hitting any live wires located in the electrical circuit panel box, thereafter the person can then identify which conduit within the electrical circuit panel box contains the fishtape by visually inspecting the closed ended tubular threaded safety device.

Still further features of my invention include the closed ended tubular threaded safety device as described above, wherein the tube has at least a 1 inch length and has a diameter ranging between ½ inch and 4 inches.

Yet other features relate to my closed ended tubular threaded safety device as described above, wherein the tube is made of a plastic material.

Even further features of my invention concern my closed ended tubular threaded safety device as described above taken in combination with an electrical circuit panel box having at least one conduit with a male threaded end extending therein, whereby one person can feed a fishtape through the conduit until the fishtape hits the closed end of the tube without hitting any live wires located in the electrical circuit panel box, thereafter the person can then identify which conduit within the electrical circuit panel box contains the fishtape by visually inspecting the closed ended tubular threaded safety device.

DESCRIPTION OF THE DRAWINGS

Other features of my invention will become more evident from a consideration of the following detailed description of my Patent drawings, as follows.

DETAILED DESCRIPTION OF THE PREFERRED EMBODIMENT

Figure 1:
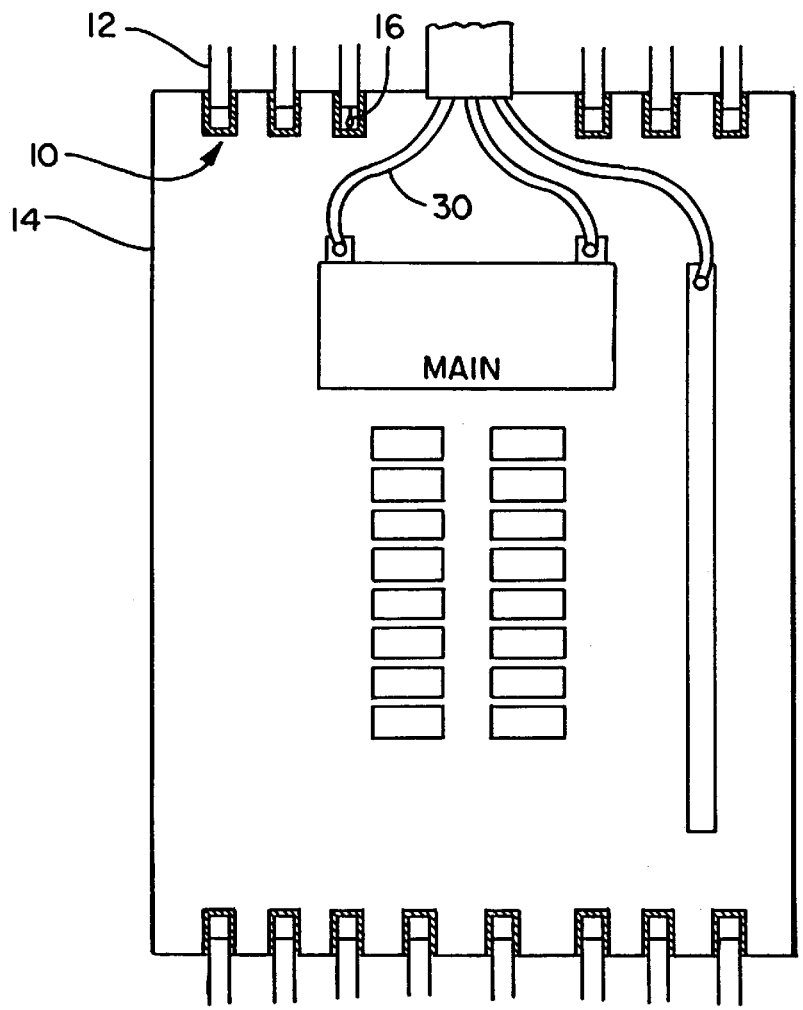
FIG. 1 is a plan view of a circuit panel box having my closed ended tubular threaded devices installed therein.

Referring now to the drawings, FIG. 1 shows my new and improved closed ended tubular threaded safety device 10 installed onto a conduit 12 within an electrical circuit panel box 14. My closed ended tubular threaded safety device 10 is designed to be temporarily placed on the conduit 12 when feeding a fishtape 16.

Figure 2:
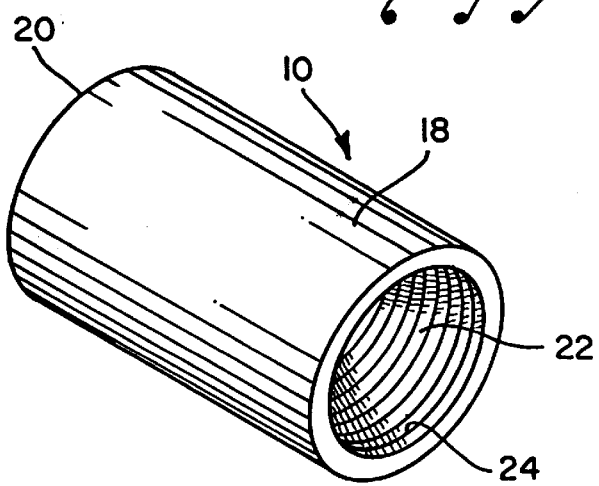
FIG. 2 is a enlarged perspective view of my closed ended tubular threaded device embodying important features of my invention.
Figure 3:
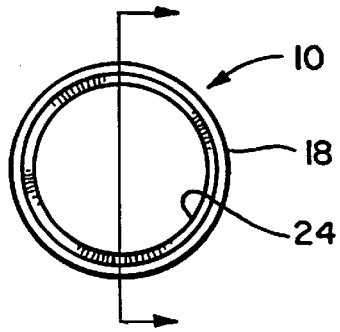
FIG. 3 is an enlarged bottom plan view of my closed ended tubular threaded device.
Figure 4:
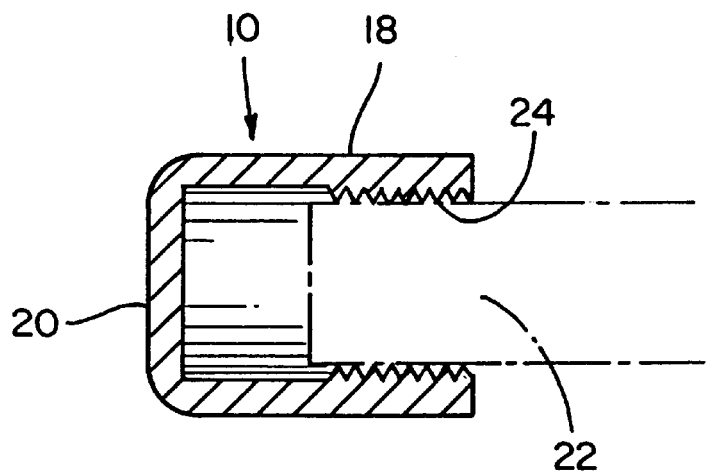
FIG. 4 is an enlarged cross-sectional side view of my closed ended tubular threaded device as taken along lines 4—4 in FIG. 3.
Figure 5:
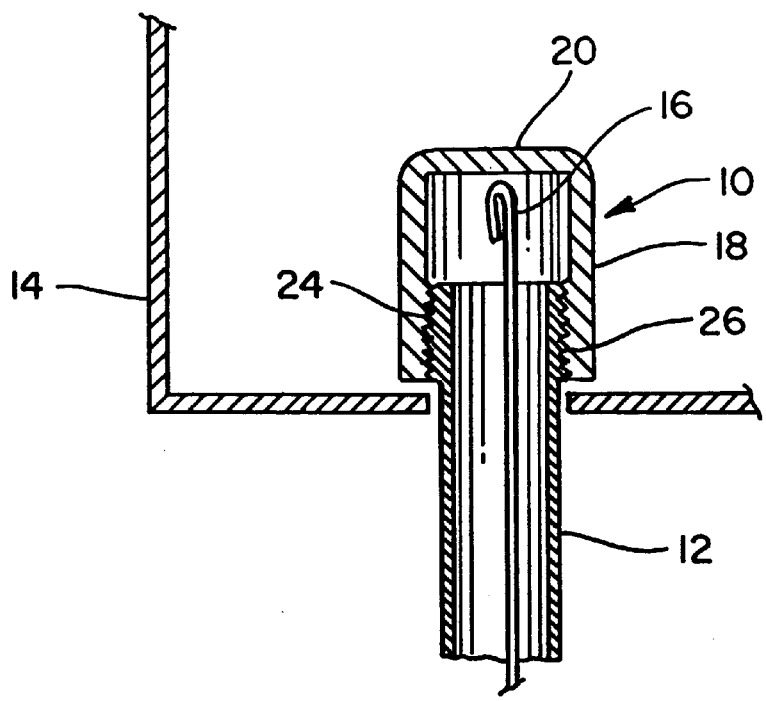
FIG. 5 is an enlarged cross-sectional side view of my closed ended tubular threaded device as installed within a circuit panel box.

My closed ended tubular threaded safety device comprises a tube 18 (FIGS. 2–4) having a closed end 20 and an open end 22 opposite the closed end. The tube 18 is designed to have internal female threads 24 adjacent the open end. The threads 24 are sized for mated threaded engagement with the male threaded end 26 (FIG. 5) of conduit 12 that extends within an electrical circuit panel box 14. The threads 24 are sized to fit standard conduit thread sizes.

It is ideal for the tube 18 to be made of a translucent material, such as plastic, whereby when said tube 18 is threadingly engaged upon a male threaded end 26 of a conduit 12 extending within an electrical circuit panel box 14, one person can feed a fishtape 16 through the conduit until the fishtape 16 hits the closed end 20 of the tube 18 without the fishtape hitting any live wires 30 (FIG. 1) located in the electrical circuit panel box 14. After the fishtape 16 hits a barrier or the end 20 of the tube 18, a person can then identify which conduit 12 within the electrical circuit panel box 14 contains the fishtape 16 by visually inspecting the closed ended tubular threaded safety device 10.

Excellent results can be obtained when the closed ended tubular threaded safety device 10 has at least a 1 inch length and has a diameter sized to fit standard electrical conduits. Standard electrical conduits typically range in sizes between ½ inch and 4 inches, however other different sizes can also be used to accommodate larger or smaller conduit sizes.

Figure 6:
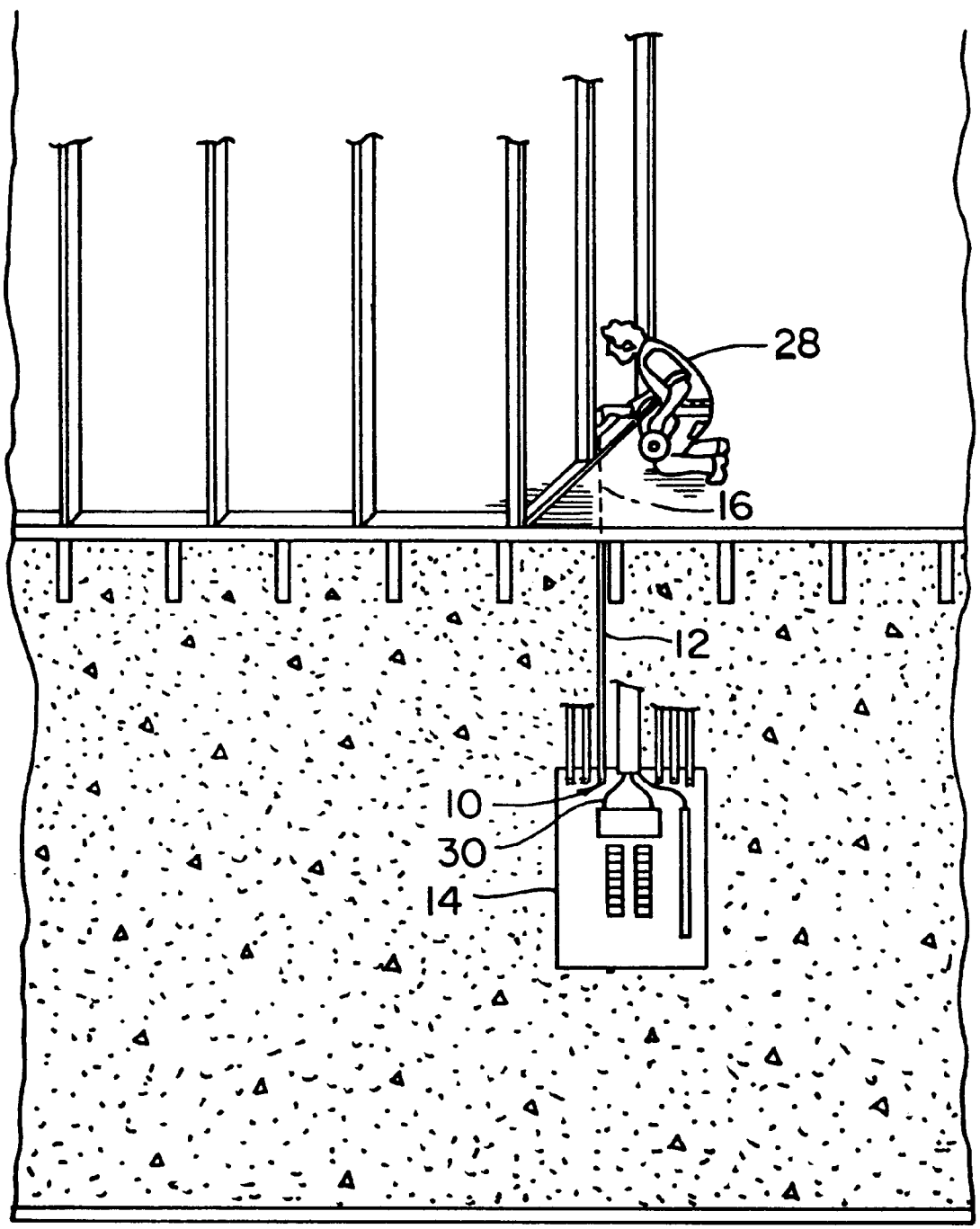
FIG. 6 is a partial perspective view of two floors of a building showing a person feeding fishtape to the circuit panel box in the floor below.

FIG. 6 illustrates how a person 28 can feed a fishtape 16 through a conduit 12 into an electrical circuit panel box 14, wherein the fishtape is electrically insulated from contact with live electrical wires at the electrical circuit panel box by placing my translucent shielding 10 onto the end of the conduit.

In order to properly use my invention proposed herein, my closed ended threaded tubular safety device or translucent shielding 10 is first placed onto a first end of the conduit 12 extending into the electrical circuit panel box 14. One can then feed a fishtape 16 through a second end of the conduit 16 until the fishtape hits the barrier put forth by the translucent shielding 10. One can then visually inspect the translucent shielding within the electrical circuit panel box 14 to locate an end of the fishtape 16. After the fishtape has been located, the translucent shielding 10 can be removed from the conduit 12 and appropriate wires can now be installed within the conduit.

Excellent results can be obtained when my translucent closed ended tubular device is placed on each empty conduit extending within the electrical circuit panel box since the person feeding the fishtape may not know exactly which conduit within the electrical circuit panel box will carry the fishtape.

As various possible embodiments may be made in the above invention for use for different purposes and as various changes might be made in the embodiments and method above set forth, it is understood that all of the above matters here set forth or shown in the accompanying drawings are to be interpreted as illustrative and not in a limiting sense.

I claim:

1. A method for one person to feed a fishtape through a conduit into an electrical circuit panel box remotely located from a point of infeed of the fishtape into the conduit and electrically insulating the fishtape from contact with live electrical wires at the electrical circuit panel box, including the steps of:

a) placing a translucent closed ended tubular device onto a first end of an empty conduit extending within the electrical circuit panel box;

b) going to a location remote from the electrical circuit panel box and then feeding a fishtape through a second end of the conduit until the fishtape hits the translucent closed ended tubular device positioned at the first end of the conduit;

c) visually inspecting the translucent closed ended tubular device within the electrical circuit panel box to locate the fishtape; and d) removing the translucent closed ended tubular device that contains the fishtape, whereby one person can feed a fishtape through the conduit until the fishtape hits the translucent closed ended tubular device without hitting any live wires located in the electrical circuit panel box, thereafter the person can then identify which conduit within the electrical circuit panel box contains the fishtape by visually inspecting the closed ended tubular threaded safety device.

2. The method of claim 1, wherein a translucent closed ended tubular device is placed on a series of empty conduits extending from the location remote from the electrical circuit panel box to the electrical circuit panel box so that all conduits are electrically isolated within the electrical circuit panel box.

3. A method for one person to feed a fishtape through a conduit into an electrical circuit panel box and electrically insulating the fishtape from contact with live electrical wires at the electrical circuit panel box, said electrical panel box having a plurality of empty conduits extending within, the method including the steps of:

a) placing translucent shielding onto a first end of an empty conduit extending within the electrical circuit panel box to provide a physical barrier to avoid electrical contact between the fishtape and any live electrical wires at the electrical circuit panel box;

b) feeding a fishtape through a second end of the conduit until the fishtape hits the barrier positioned at the first end of the conduit;

c) visually inspecting the translucent shielding within the electrical circuit panel box to locate the fishtape; and d) removing the translucent shielding from the conduit to expose the fishtape to enable an electrical to be made at the electrical circuit panel box, whereby one person can feed a fishtape through the conduit until the fishtape hits the barrier without hitting any live wires located in the electrical circuit panel box, thereafter the person can then identify which conduit within the electrical circuit panel box contains the fishtape by visually inspecting the translucent shielding.

4. The method of claim 3, wherein translucent shielding is placed on each empty conduit extending within the electrical circuit panel box.

5. In combination, a closed ended tubluar threaded safety device and an electrical circuit panel box having a conduit with a male threaded end extending therein, said closed ended tubular threaded safety device comprising: a tube having a closed end, said tube having an open end opposite said closed end, said tube having internal female threads adjacent said open end sized to matingly engage with the male threaded end of the conduit, said tube further being made of a translucent material, said closed ended tubular threaded safety device being threadingly secured to the male threaded end of the conduit within the electrical circuit panel box, whereby one person can feed a fishtape through the conduit until the fishtape hits the closed end of the tube without hitting any live wires located in the electrical circuit panel box, thereafter the person can then identify which conduit within the electrical circuit panel box contains the fishtape by visually inspecting the closed ended tubular threaded safety device.

6. The combination of claim 5, wherein said closed ended tubular threaded safety device has at least a 1 inch length.

7. The combination of claim 5, wherein said closed ended tubular threaded safety device has a diameter ranging between ¼ inch and 2 inches.

8. The combination of claim 5, wherein said closed ended tubular threaded safety device is made of a synthetic material, and said tube being at least one inch in length.

* * * * *